No. 720,527. PATENTED FEB. 10, 1903.
H. T. KRAKAU.
DRAFT RIGGING.
APPLICATION FILED JAN. 26, 1901.

NO MODEL. 7 SHEETS—SHEET 1.

WITNESSES
Thomas W. Bakewell

INVENTOR
H. T. Krakau

No. 720,527. PATENTED FEB. 10, 1903.
H. T. KRAKAU.
DRAFT RIGGING.
APPLICATION FILED JAN. 26, 1901.
NO MODEL. 7 SHEETS—SHEET 2.

WITNESSES
INVENTOR
H. T. Krakau

No. 720,527. PATENTED FEB. 10, 1903.
H. T. KRAKAU.
DRAFT RIGGING.
APPLICATION FILED JAN. 26, 1901.
NO MODEL. 7 SHEETS—SHEET 3.

WITNESSES
INVENTOR

No. 720,527. PATENTED FEB. 10, 1903.
H. T. KRAKAU.
DRAFT RIGGING.
APPLICATION FILED JAN. 26, 1901.
NO MODEL. 7 SHEETS—SHEET 4.

Fig. 11.

WITNESSES
INVENTOR
H. T. Krakau

No. 720,527. PATENTED FEB. 10, 1903.
H. T. KRAKAU.
DRAFT RIGGING.
APPLICATION FILED JAN. 26, 1901.
NO MODEL. 7 SHEETS—SHEET 5.

WITNESSES
INVENTOR

No. 720,527. PATENTED FEB. 10, 1903.
H. T. KRAKAU.
DRAFT RIGGING.
APPLICATION FILED JAN. 26, 1901.
NO MODEL. 7 SHEETS—SHEET 6.

WITNESSES
Thomas W. Bakewell
L. A. Connery

INVENTOR
H. T. Krakau

No. 720,527. PATENTED FEB. 10, 1903.
H. T. KRAKAU.
DRAFT RIGGING.
APPLICATION FILED JAN. 26, 1901.
NO MODEL. 7 SHEETS—SHEET 7.

WITNESSES
INVENTOR

UNITED STATES PATENT OFFICE.

HARRY T. KRAKAU, OF CLEVELAND, OHIO, ASSIGNOR TO THE NATIONAL MALLEABLE CASTINGS COMPANY, OF CLEVELAND, OHIO, A CORPORATION OF OHIO.

DRAFT-RIGGING.

SPECIFICATION forming part of Letters Patent No. 720,527, dated February 10, 1903.

Application filed January 26, 1901. Serial No. 44,825. (No model.)

*To all whom it may concern:*

Be it known that I, HARRY T. KRAKAU, of Cleveland, in the county of Cuyahoga and State of Ohio, have invented a new and useful Draft-Rigging, of which the following is a full, clear, and exact description, reference being had to the accompanying drawings, forming part of this specification, in which—

In the accompanying drawings, 2 represents the body-bolster of a car.

3 is the truck-bolster.

4 is the end sill, and 5 is the shank of a draw-bar supported beneath the end sill by a carry-iron 6, which is upheld from the sill by a suitable bracket or support 7. A frame 8 extends back from the sill nearly to the bolster, where it terminates in a head 9, constituting the head of a draft-rigging and suitably shaped to fit upon parallel segment-bars 10, which are curved from a center, preferably substantially coincident with the axis of the center plates 11 of the car-truck. The segment-bars 10 are secured to or form part of a frame 12, which is attached to the car-bolster. The part 13 of frame 12 is interposed between the bolster and the end of the head 9 and backs the head and transmits the strains of buffing through the bolster to the car-frame, thus relieving the segment-bars 10.

The frame 8 may be a single casting or may be made of several sections. The preferred form is sufficiently indicated by the several cross-sectional views without needing further description, the parts of the frame at the rear of the draw-bar being separated laterally into two branches 8 8' to accommodate the straps of the yoke 14, which extends rearwardly from the draw-bar and contains the draft spring or springs 15 and the followers 16 17, which constitute the load-transmission element. The outer sides of these followers bear against projections or webs 18, fixed to or forming part of the yoke, and are adapted to be engaged by stops 17' on the frame 8 when they are at the limit of their motion. They also have projections 16' at their middle and corners, which serve as stops to check the spring before it passes the proper limit of its compression. The webs 18 are desirable, because they impart great strength to the yoke, being preferably made integral with one of its arms and fitted in notches in the other arm. They may be replaced by any suitable projections on the yoke, or the forward web 18 may be omitted and the follower 17 arranged to make direct contact with the rear end of the draw-bar.

The frame 8 is movable radially on the segment 10 and at its front end is slidingly connected with the sill 4 or with a shoe 19 thereon by suitable means, such as a lip 20, which engages the outer end of the shoe, and a projection 21, which fits in a guiding-groove in the shoe and resists longitudinal motion of the frame, but permits radial swinging on the segments 10. The end sill being thus braced by the interposition of the frame 8 between the sill and bolster is enabled to resist severe buffing blows without breaking, and I thus obviate what has been a prolific source of injury to railway-cars. This feature of my invention I regard as new without reference to the swinging of the frame on the rear bearing. It enables me to transmit the strains of buffing and draft longitudinally to the sill and bolster without the intervention of draft-timbers and lateral bolts, which heretofore have been the parts of the draft-rigging most liable to injury and requiring most frequent renewal.

Figures 1, 2, 3:
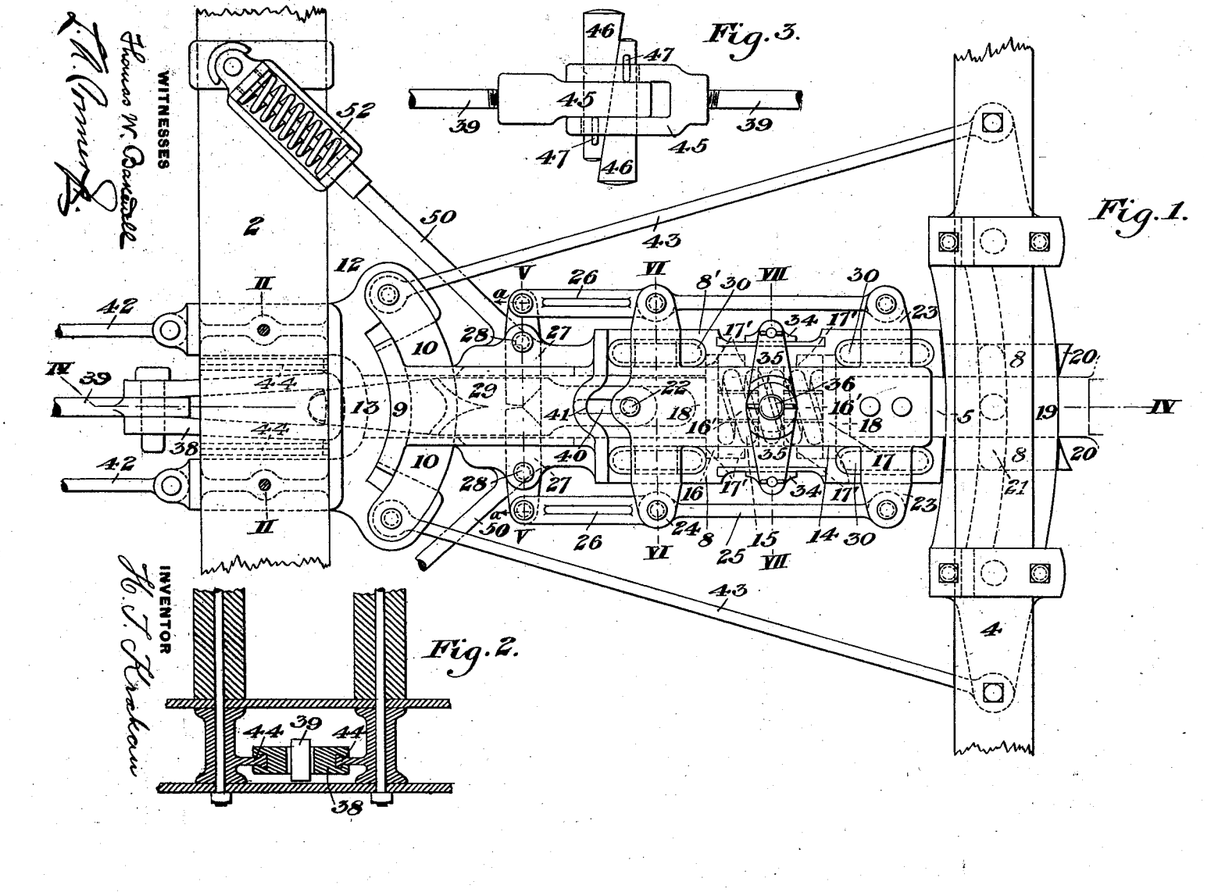
Figure 1 is a plan view of my improved draft-rigging.
Fig. 2 is a vertical section on the line II II of Fig. 1.
Fig. 3 is a detail view showing the means for automatically taking up slack of the rod 39 and extends from one end of the car to another.
Figures 4, 5, 6, 7, 8:
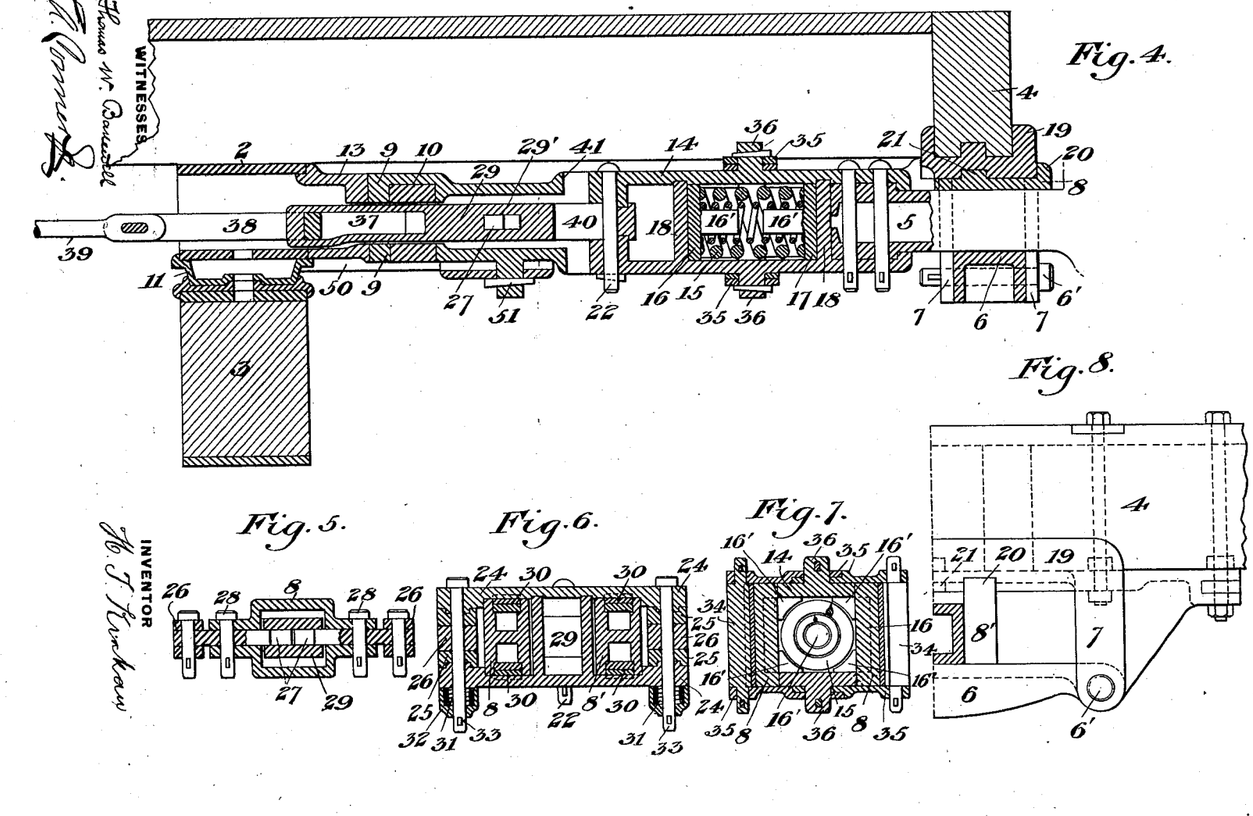
Fig. 4 is a longitudinal central section on the line IV IV of Fig. 1.
Figs. 5, 6, and 7 are vertical cross-sections on the lines V V, VI VI, VII VII, respectively.
Fig. 8 is a partial end elevation of the end sill of the car.
Figures 20, 21:
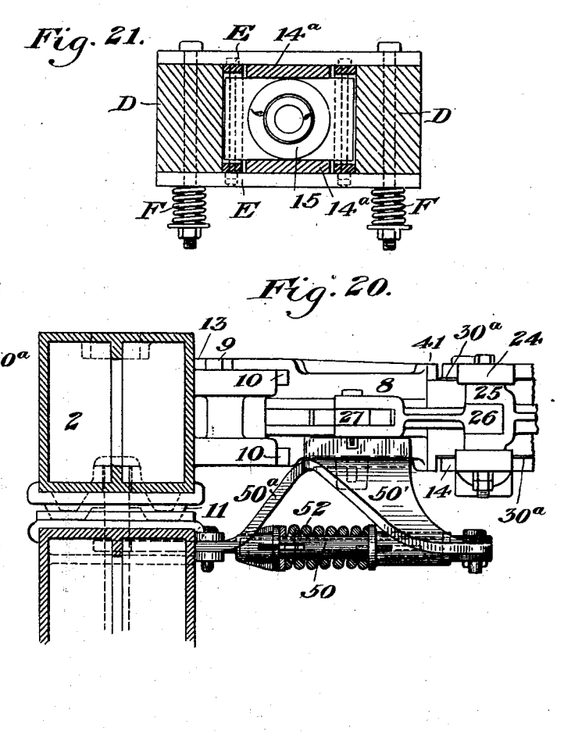
Fig. 20 is a side elevation of the same, partly in section.
Fig. 21 shows in cross-section one feature of my invention applied to the yoke of a draw-bar of ordinary construction.

The yoke 14 is preferably made of two bars or straps attached at the front end to the shank of the draw-bar and connected together at the rear end by a pin 22. It preferably has laterally-projecting arms 23 24, connected and braced by rods 25, and the arms 24 are connected by links 26 with levers 27, which are fulcrumed on pins 28 to the frame 8 and have their ends fitting in a socket 29' in a bar 29. This bar is connected at 40 to the pin 22 and extends rearwardly past or between the segments 10. The yoke 14 slides upon the parts of the frame 8, being preferably fitted with slide plates or shoes 30, Fig. 6, which constitute the variable resistance element of the draft-rigging, and in order to create frictional resistance to the longitudinal motion of the yoke I prefer to draw its parts together upon the frame by springs 31, which constitute the constant resistance element, and are fitted in caps 32, held by wedges or keys 33, which keep the springs in tension. These springs by bearing downwardly against the yoke back of the carry-iron 6 keep its rear end from rising, preserving parallelism with the frame of the car, and prevent the coupler from drooping. I intend to cover, broadly, the vertical spring-bearings upon the yoke back of the carry-iron, whether the same be applied to the draft-rigging shown in the drawings or to draft-riggings of other forms. For example, in Fig. 21 I show a yoke 14$^a$, set between draft-timbers D and bearing on the upper and lower sides against plates E, one of which is pressed against the yoke by springs F. In order to provide further for resistance to the motion of the yoke upon the frame, I may employ friction plates or shoes 34, Fig. 1, bearing against the sides of the frame and connected by levers 35 with a stud 36 at the middle of the yoke, so that as the yoke moves backward or forward in buffing or pulling the stud will move the levers and will cause the shoes 34 to bind or press laterally against the sides of the yoke and to oppose to its motion a frictional resistance which increases in proportion to the length of travel of the yoke and to the force exerted upon the yoke by the pulling or buffing. The rear end of the yoke 14 is adapted to engage a stop portion 41 on the frame 8 and to be limited thereby in its backward motion. The frame 12 may be braced and connected by rods 42 with the bolster at the other end of the car and by rods 43 with the end sills or with projecting portions of the shoes 19.

The bar 29 has a longitudinal slot 37, in which is fitted a link 38, extending rearwardly through the bolster 2 and connected by a rod 39 with a corresponding part at the other end of the car. The link 38 affords to the parts at or near the axial line of the truck center plate a flexible connection which permits the draft-rigging to swing freely on the segment-bars and also enables the strain of draft to be transmitted freely from end to end of the car, whether the car is on a straight track or on a curve. I may provide the sides of the link 38 with slideways fitting against parallel slides 44 on the bolster, so as to guide the link in its longitudinal motion. In order to take up slack, I prefer to provide at the middle of the rod 39 a slack-adjuster, Fig. 3, comprising two interfitted links 45, provided with wedge-keys 46, having spring-cotters 47, which tend to draw the wedges together to compensate for any wear of the parts.

The yoke 14 being made in two sections held together by removable bolts, the draw-bar may be detached readily from the car for purposes of substitution or repair by loosening the said bolts, withdrawing one of the pins 6', by which the base of the carry-iron 6 is held at each end, dropping the carry-iron, and then removing the draw-bar and yoke from below. By taking off the segments 10 10 the frame 8 may also be detached and removed. This capability of my improved device affords great saving in labor, and the construction above described reduces largely the number of bolts by which the draft-riggings are held to the car.

Figure 19:
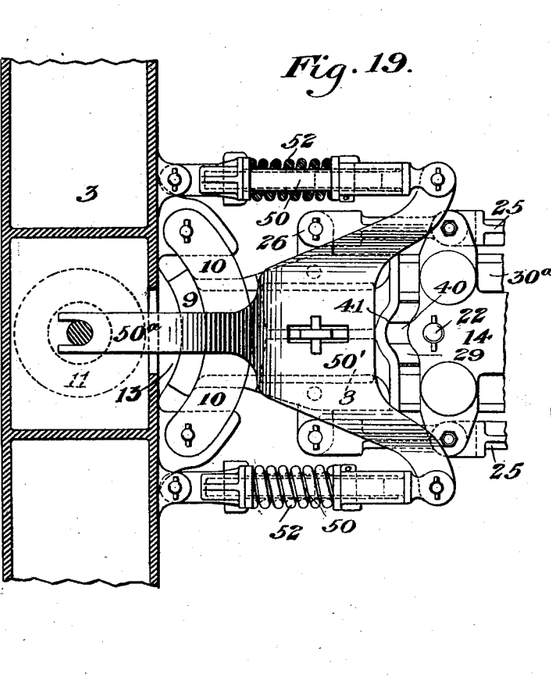
Fig. 19 is an inverted plan view of a modified construction of the centering-springs applied to the form of draft-rigging shown in Fig. 11.

In the operation of my device when the cars are passing a curve the draw-bars do not project rigidly in the middle longitudinal lines of the car-body; but they will swing laterally on centers substantially coincident with the center plates of the trucks. The draft is therefore always on a line which connects the center plates of the trucks, and in passing around curves the cars will not cramp the couplers or draft-riggings, which will remain in alinement with each other and by reason of their flexibility will prevent straining and wearing of the parts of the car and truck. When the car is uncoupled, the draft-rigging is kept projecting in proper position at right angles from the truck by guide-rods 50, which extend from a stud 51 on the frame 8 to the truck-bolster, spring-cages 52 being preferably interposed in these rods to render them somewhat extensible. The guide-rods 50 are fixed at their forward ends to a holder-plate 50', Figs. 19 and 20, which fits the frame 8 and holds it at right angles to the truck, while it permits it to have a slight relative longitudinal motion. The plate 50' has also preferably a connection 50$^a$ with the truck at a point or place concentric with the center-pin or center plates thereof. I am thus enabled to hold the frame in the desired position when the car is coupled with another car not provided with my improvement without cramping of the parts and without causing the springs 52 to put strain upon the segment-bars 10. When a pulling strain is exerted on the coupler, it will draw the yoke 14 forward, thus moving the projection 18 against the follower 16 and compressing the spring against the other follower, 17, which is held by the stop 17' on the frame 8. The strain will thus be transmitted to the frame 8 by the follower 17 and also by the plates or shoes 34, which are forced frictionally against the frame and oppose resistance to the motion of the yoke. The strain thus transmitted to the frame 8 is exerted upon the end sill through the parts 20 and 21 and upon the curved segments 10 at the rear of the frame and is transmitted by the rods 42 to the other end of the car. When a buffing force is exerted upon the coupler, it will move the yoke 14 rearwardly and by the action of the stud 36 and levers 35 will cause the plates or shoes 34 to bind frictionally upon the sides of the frame and to resist motion of the yoke, as above explained. It will also move the follower 17 back and will compress the spring against the follower 16, which is held by its stops on the frame 8 and transmits the strain through these stops to the frame and thence to the sill 4 and curved segments 10, as above explained, the pressure on the curved segments being relieved by the bearing of the head 9 of the frame 8 against the bolster through the piece 13, which is interposed between the head and bolster. The rearward motion of the yoke acting through the links 26 and levers 27 will turn these levers in the direction of the arrows $a$ on their pivots 28 on the frame 8 and will cause them to draw the bar 29 forwardly, thus pulling on the link 38 and rod 39, and through these parts the buffing force will be transmitted by a pulling motion from one end of the car to the spring mechanism and friction devices at the other end. By thus connecting the spring and friction mechanisms at the two ends of the car and causing them to work together I increase the efficiency of the draft-rigging, remove the strain from the car-frame, and render the mechanism stronger and more durable. If the rod 39 should break or be injured, the working of the other parts of the draft-rigging will not be prevented; but in such case the draft-rigging at each end of the car will operate independently of the other. I do not know of any prior device having this function, since heretofore injury to the so-called "continuous connecting-rods" has put the entire spring mechanism of the draft-rigging out of action.

Figure 9:
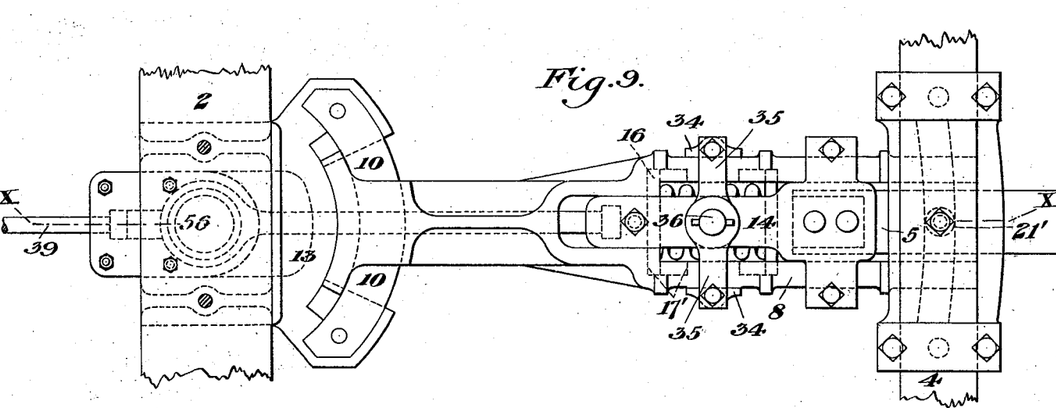
Figs. 9 and 10 show a modification, Fig. 9 being a plan view and Fig. 10 a longitudinal section on the line X X of Fig. 9.
Figure 10:
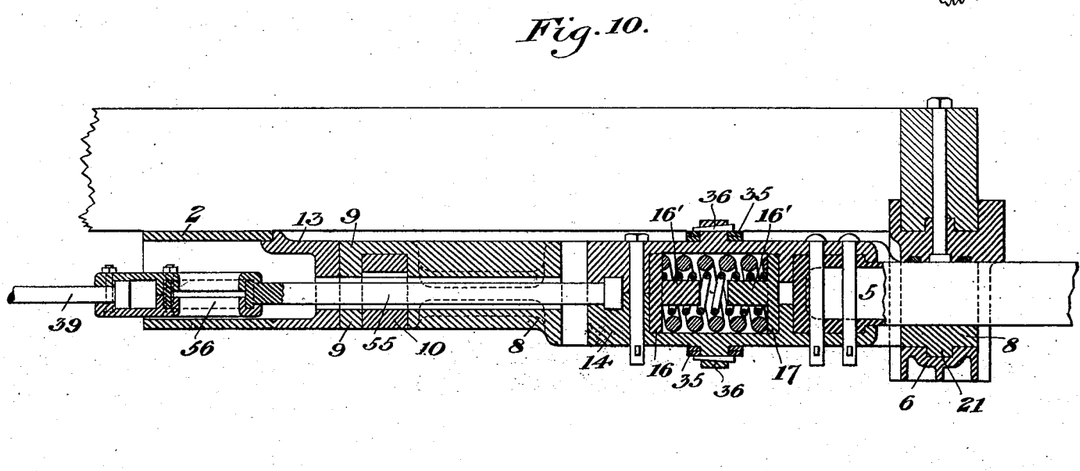

It will be noticed that in the construction above described the frame along which the draw-bar and yoke move bears at one end against the bolster and at the other end against the sill, so as to distribute between the bolster and sill the strains of buffing and draft. This is true also of the construction shown in Figs. 9 and 10. In these figures the arms 23 and 27 are not used; but a rod 55 and interposed circular link 56 at the axial line of the truck center plate connect the draw-bar with the rod 39, which extends to the other end of the car and transmits directly thereto the force applied in draft, but not the force applied in buffing. In these figures I show the projection 21' formed on the under side of the frame 8 and adapted to engage the carry-iron 6.

Figure 11:
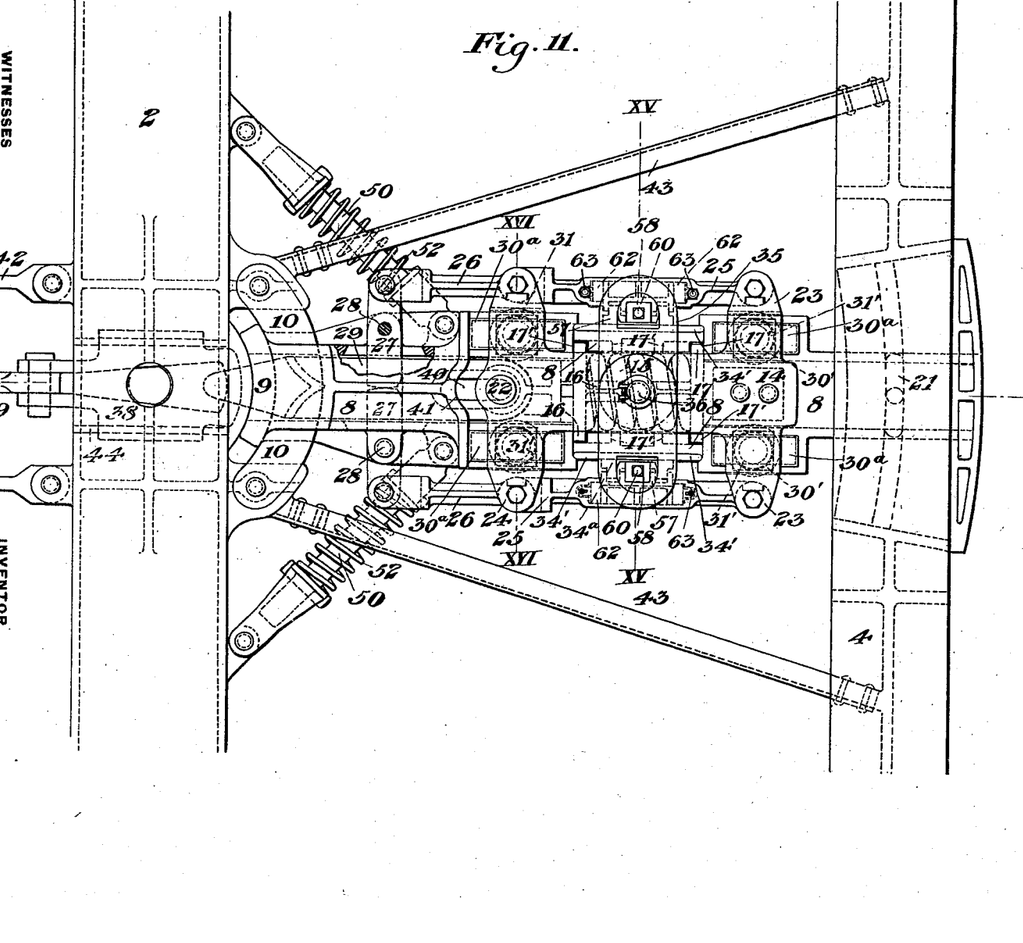
Fig. 11 is a plan view of another modification of my invention, and in this figure I show the device as applied to a car having metal end sills and bolsters.
Figure 12:
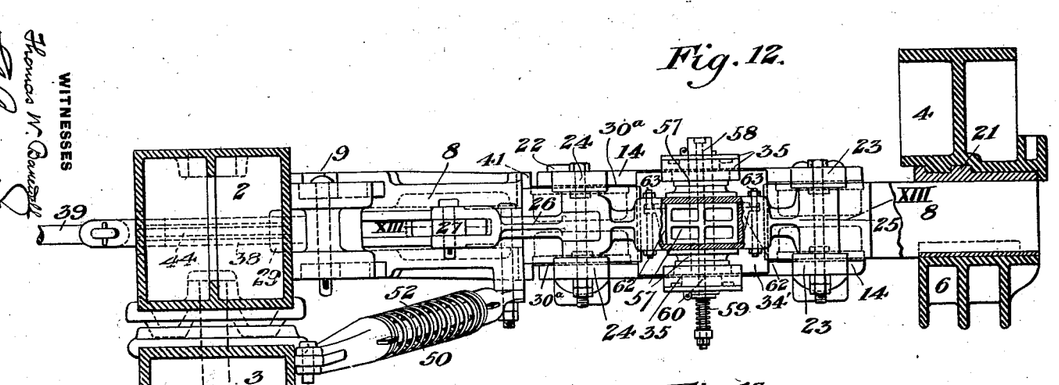
Fig. 12 is a side elevation, partly in section, of the form of rigging shown in Fig. 11.
Figure 13:
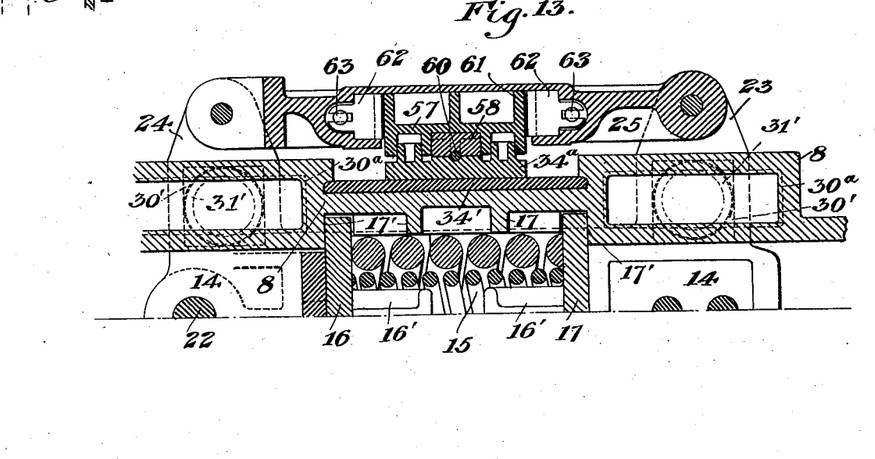
Fig. 13 is a horizontal section, on a larger scale, showing the friction plates or surfaces, the section being on the line XIII XIII of Fig. 12.
Figure 14:
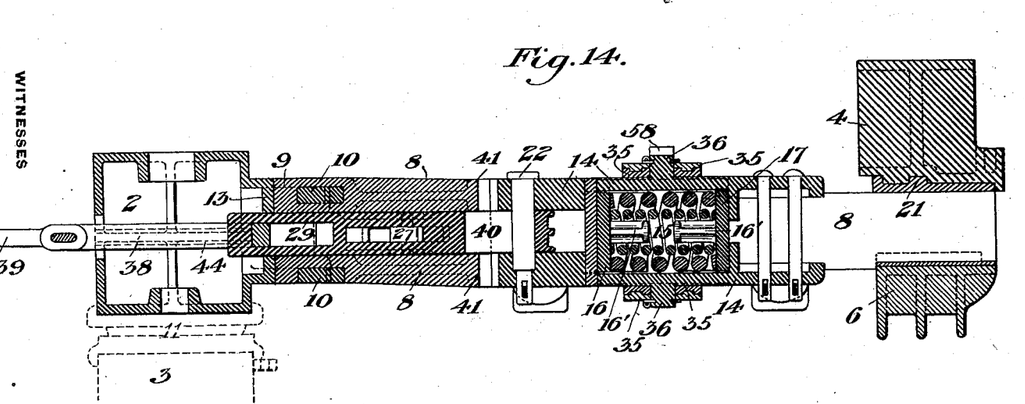
Fig. 14 is a longitudinal section on the line XIV XIV of Fig. 11.
Figures 15, 16:
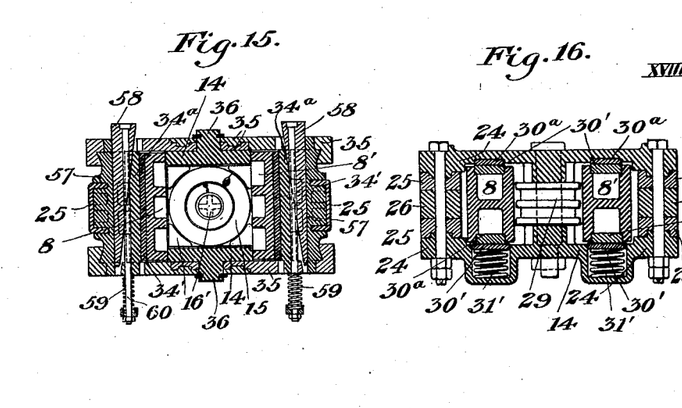
Figs. 15 and 16 are vertical cross-sections on the lines XV XV and XVI XVI of Fig. 11.
Figure 17:
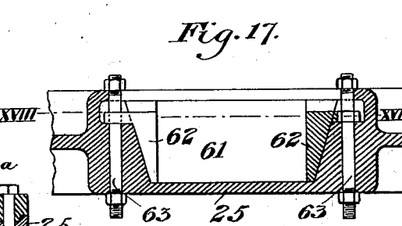
Fig. 17 is an enlarged detail view of the connecting-link, showing the same in vertical longitudinal section.
Figure 18:
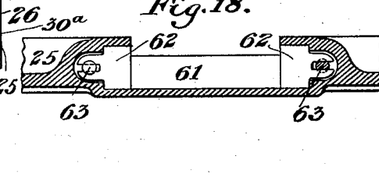
Fig. 18 is a horizontal section on the lines XVIII XVIII of Fig. 17.

In Figs. 11 to 18 I show a modified construction of my invention. In these figures the springs 31' instead of being on the outside of the straps of the yoke 14, as shown in the other figures, are set in pockets on the inner sides thereof and have plates or shoes 30', which bear against corresponding plates or shoes 30ª on the frame. Similar plates 30' and 30ª are set on the upper side of the frame between the frame and the yoke. These springs exert frictional action upon the motion of the draw-bar and hold the yoke parallel with the frame and prevent drooping of the coupler, as above explained, and enable the yoke and the connecting-arms 25 and 26 to be drawn rigidly together by the bolts, as shown in Fig. 16. The lever mechanism shown in Figs. 11 and 15 is also of modified construction. The toggle-levers above and below the yoke are connected by bearings 57, and between these bearings and the shoe 34' is interposed a key 58, which is drawn inwardly by gravity and by a spring 59 and bolt 60 and which serves to keep the shoe fitting against its bearing-plate 34ª on the frame 8 and to take up wear automatically. This causes the toggles to have a constant stroke unaffected by the wear of the parts, and thus enables my device to act uniformly at all times. In Fig. 13 these parts are shown in horizontal section. I also show in Figs. 13, 17, and 18 means for adjusting the extent of the toggle action and the degree of friction exerted thereby. I prefer to effect this by forming on the side of each rod 25 a lateral recess 61, which contains the bearing-pieces 57, and between said bearing 57 and the ends of the recess I place vertical wedges 62, having bolts 63, by which the wedges may be moved and adjusted to lengthen or shorten the distance between their inner parallel faces. When these wedges are set closely against the interposed bearing 57, so as to be as near to each other as possible, the toggles have no motion, for in such case the ends of the toggle-levers will move to the same extent as the joint in the middle; but by setting these wedges so as to afford lost motion between the ends of the recess and the bearing the toggles are permitted to move to assume an angle to each other and to cause the friction-plates to exert a clamping action which varies proportionately to the degree of such angle. This gives accurate and simple means for adjusting the action of the friction device to secure the greatest efficiency in practice. The skilled mechanic will understand that this adjusting mechanism, as well as the adjusting device shown in Fig. 15, may be modified in many ways without departure from my invention, since I regard these features of my invention as broadly new.

I claim—

1. A draft-rigging having a draw-bar, friction plates or surfaces operated by longitudinal motion of the draw-bar, adjusting mechanism for the frictional surfaces to compensate for wear thereon and means for actuating said adjusting mechanism; substantially as described.

2. A draft-rigging having a draw-bar, friction plates or surfaces operated by longitudinal motion of the draw-bar, adjusting mechanism for the frictional surfaces to compensate for wear thereof; and a spring for actuating it automatically; substantially as described.

3. A draft-rigging having a draw-bar, friction-plates, levers connected with the friction-plates and operated by longitudinal motion of the draw-bar, and wedges interposed between the friction-plates and the levers and arranged to take up wear on the parts; substantially as described.

4. A draft-rigging having friction-plates, sets of toggle-levers at opposite edges of the plates, a connection between said sets of toggle-levers, and a frame on the sides of which the friction-plates bear; substantially as described.

5. A draft-rigging having a yoke, a frame, friction-plates bearing on the frame, sets of toggles connecting the yoke with the friction-plates, a connecting-bearing between the sets of toggles, and a wedge between the bearing and the friction-plates; substantially as described.

6. A draft-rigging having friction-plates, operated by longitudinal motion of the draw-bar, and adjusting mechanism arranged to vary the extent of frictional pressure exerted by a given motion of the draw-bar; substantially as described.

7. A draft-rigging having friction-plates, a connecting device operated by longitudinal motion of the draw-bar, and means arranged to vary the extent of motion of said connecting device and thus to vary the clamping action of the friction-plates; substantially as described.

8. A draft-rigging having friction-plates, toggle-levers connected therewith, and actuated by the draw-bar, and connections between the draw-bar and the ends of the toggles, said toggles having loose motion in said connection, whereby the extent of action of the toggles may be controlled; substantially as described.

9. A draft-rigging having a draw-bar, toggle-levers and friction plates or surfaces actuated thereby, and a part which moves with the draw-bar and has adjustable stop portions whereby the angular motion of the toggles may be regulated; substantially as described.

10. A draft-rigging having a draw-bar, a carry-iron, and a vertically-acting spring-bearing arranged to act downwardly upon the draw-bar or its yoke back of the carry-iron; substantially as described.

11. A draft-rigging having a draw-bar and yoke, a frame along which the yoke can move, a carry-iron, and a spring-actuated frictional bearing between the yoke and frame and acting downwardly on the yoke back of the carry-iron; substantially as described.

12. In a draft-rigging for railway-cars, the combination with a load-transmission element, and draft and buffing variable resistance elements, of a constant resistance element opposed to said variable resistance elements, substantially as and for the purposes specified.

13. In a draft-rigging for railway-cars, the combination with a movable load-transmission element, of a variable resistance element which exerts a resistance in either direction proportional to the movement of the transmission element, and a normally constant resistance element which is opposed to the variable resistance element irrespective of the direction of movement of the transmission element, substantially as and for the purposes specified.

14. In a draft-rigging for railway-cars, the combination with a draft and buffing spring resistance, of a constant frictional resistance element, substantially as and for the purposes specified.

In testimony whereof I have hereunto set my hand.

HARRY T. KRAKAU.

Witnesses:
THOMAS W. BAKEWELL,
G. I. HOLDSHIP.